UNITED STATES PATENT OFFICE.

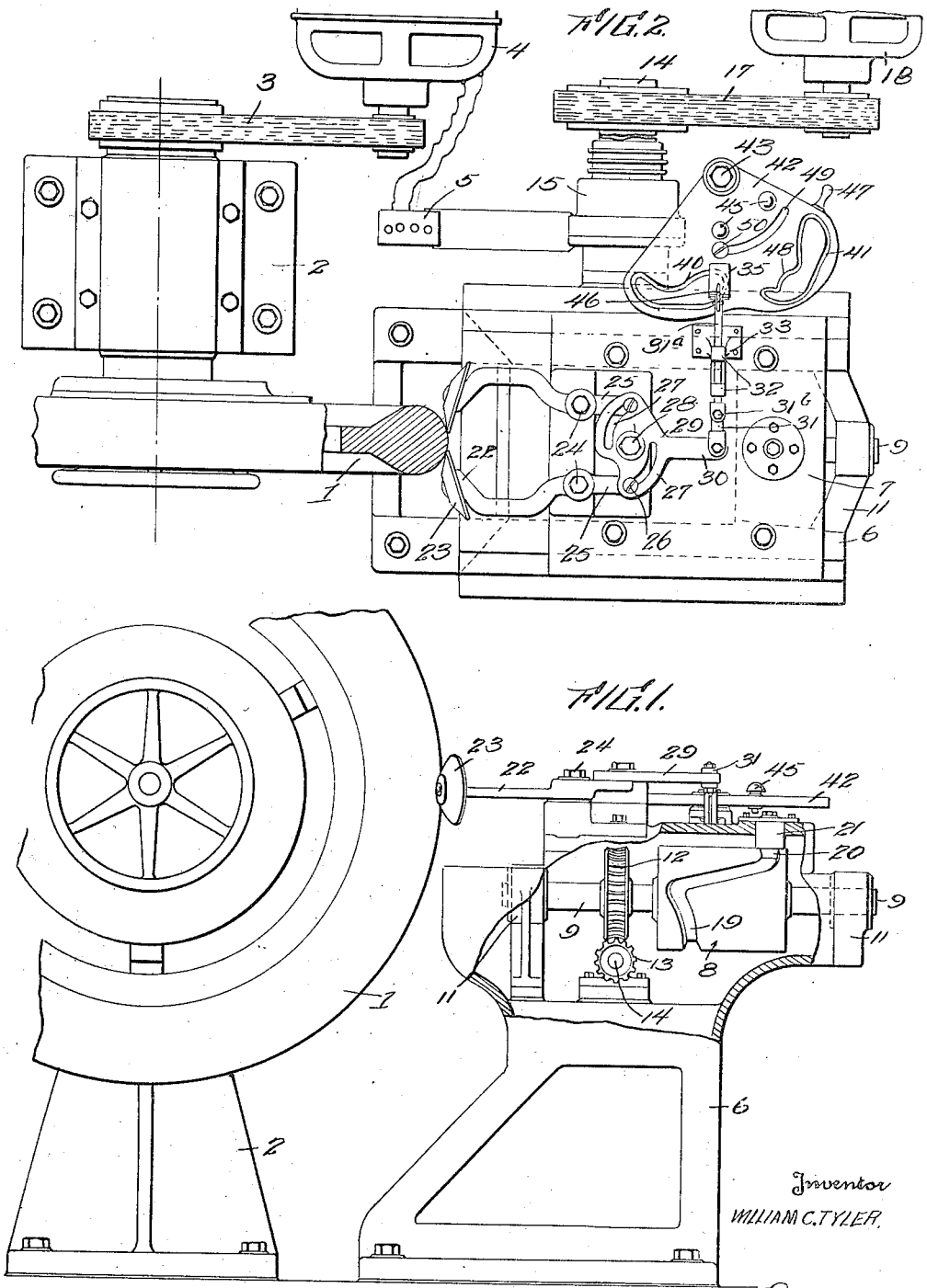

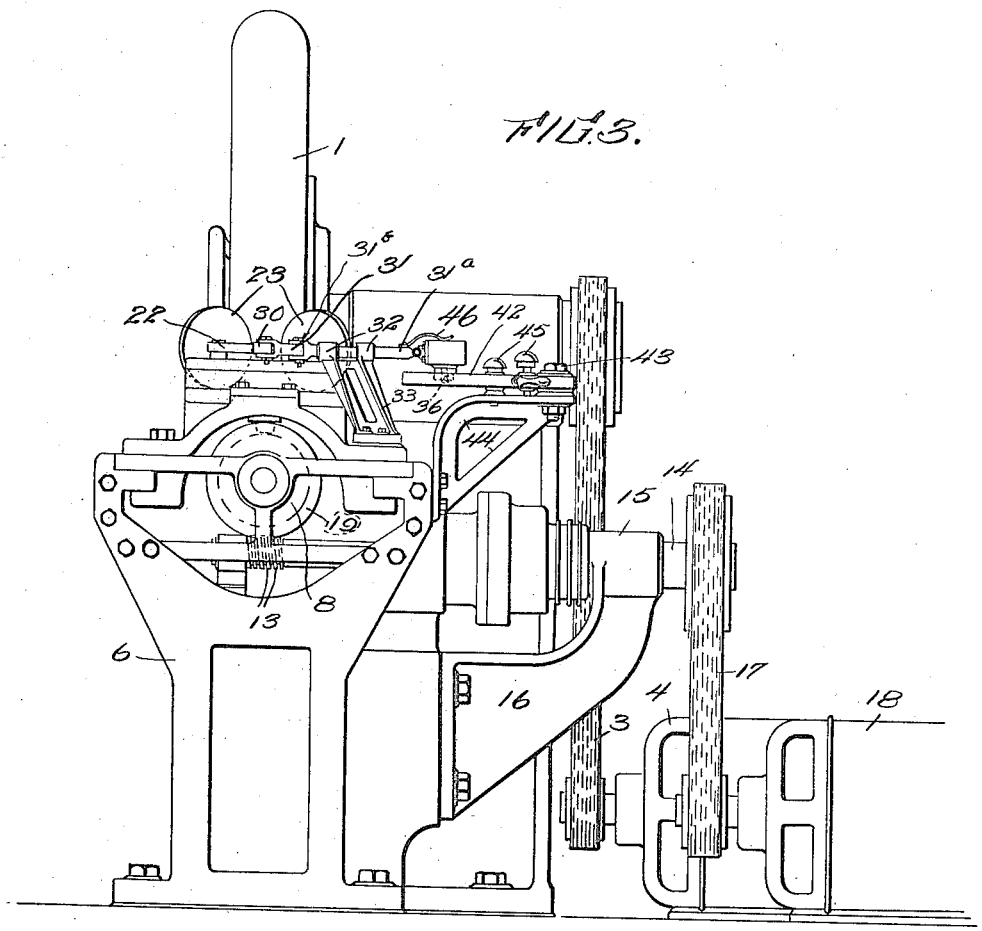

WILLIAM C. TYLER, OF RACINE, WISCONSIN, ASSIGNOR TO THE GOODYEAR TIRE & RUBBER COMPANY, OF AKRON, OHIO, A CORPORATION OF OHIO.

TIRE-MAKING MACHINE.

1,320,295.   Specification of Letters Patent.   Patented Oct. 28, 1919.

Application filed June 27, 1918. Serial No. 242,234.

*To all whom it may concern:*

Be it known that I, WILLIAM C. TYLER, a citizen of the United States, residing at Racine, in the county of Racine, State of Wisconsin, have invented new and useful Improvements in Tire-Making Machines, of which the following is a specification.

This invention relates primarily to tire-making machines, and has more particular reference to machines for constructing tire-carcasses.

In structures of this type, there is usually employed a pair of spaced-apart stitcher-disks or members mounted on supporting-arms or carriers which, in turn, are disposed for a swinging movement on a carriage which has an advancing and a receding movement in respect to a rotatable tire-forming core. Generally, it has been the practice to manipulate these arms or carriers manually. This necessarily imposes considerable labor and strain on the operator and, besides, it is difficult, usually, to insure thereby uniform action on both sides of the core. In fact, it is practically impossible to obtain equal pressure on both sides of the core. It has, it is true, been proposed to utilize various means for automatically operating—or at least controlling—the swinging movements of these arms or carriers; but, for the most part, these structures have been complicated and are not adapted successfully to perform their required controlling functions both for the "under-bead" and for the "over-bead" operations.

It is, therefore, a primary object of my invention to provide a structure, of great simplicity and compactness, which is capable of automatically positioning and controlling the carriers with equal pressure at all times on opposite sides of the core, for the "over-bead" as well as for the "under-bead" operations.

Another object is to provide means for conveniently changing the relative position of the parts so that they are adapted to function, first for the "under-bead" operation and, then, for the "over-bead" operation.

Still another important object is to provide a novel means for effecting movement of the carrier-sustaining carriage whereby it and the carriers thereon are moved toward and away from the axis of the core and, at the same time, swinging of the carriers is effected in proper synchronism with regard to the traveling movement of the carriage.

A more specific object is to provide a cam-controlled stitcher-structure capable of actuating the stitchers into, and maintaining them in engagement with the fabric-plies on the core in as nearly a human manner as possible.

Still another specific object is to provide a cam-member for accurately and equally controlling the pressure of the oppositely-disposed stitchers against the fabric-covered core.

Another object within the contemplation of my invention is to provide a cam-controlling device for advancing the carrier-sustaining carriage toward the core and, then, effecting its quick return to starting position.

The invention has other objects and advantages in view and these will be made apparent in the following description:

In order that the invention may be more readily comprehended, I have shown a preferred embodiment and utilization of the same in the accompanying drawings; these being, however, merely illustrative, since it will be manifest that the invention is susceptible of other embodiments and utilizations and, also, of a wide range of modification and variation without departing from its spirit or sacrificing any of its advantages or underlying principles.

In these drawings,

Figure 1 is a fragmentary view, in side elevation, partly in section, of a machine constructed in accordance with my invention;

Fig. 2 is a view in plan thereof;

Fig. 3 is a view in end elevation thereof; and

Fig. 4 is a sectional view of a detail of the structure.

Referring to the drawings, the reference-numeral 1 designates a tire-forming core which, in this instance, is rotatable. To that end, it is supported in a standard 2, and is driven (through a belt or sprocket 3) by a motor 4, preferably of a multi-speed type and controlled by the operator from a suitable switch 5.

Juxtaposed to the core is a stitcher-supporting stand or standard 6. On this travels a stitcher-sustaining carriage 7 adapted to have an advancing movement toward and a receding movement away from the axis of the core 1. Means for effecting these movements are provided; and, in this instance, such means preferably comprise a single mechanism for effecting both of the movements. This mechanism includes a cylindrical member or carriage-actuator 8 which is fast on a shaft 9 that turns in bearings 10 and 11 formed in opposite ends of the standard 6. On this shaft is a worm-wheel 12 adapted to mesh with and receive motion from a worm 13. This worm is carried by a transversely-extending shaft 14, journaled, as at 15, on a bracket 16. The shaft 14 receives motion (through a belt or sprocket 17) from a motor 18 juxtaposed to the core-driving motor 4, and controlled by the operator from the switch 5.

The cylindrical member 8 is provided with an irregularly-formed cam-groove 19. This groove is traversed by a roller 20 which depends from the top-plate 21 of the carriage 7 and is movable therewith. Motion having been imparted to the shaft 9 by the motor 18 through the belt 17, shaft 14, worm 13, and worm-wheel 12, this shaft imparts a rotative movement to the cam-member 8; and, as the carriage-carrying roller 20 traverses the cam 19, the carriage will be caused to move in respect to the axis of the core, first for a relatively slow advancing movement, and then for a relatively quick returning movement, the cam-groove 19 being so formed as to function to produce the character of movements referred to.

Suitably mounted on the top-plate 21 of the carriage are stitcher-supporting arms or carriers 22, there being a pair of these. Each arm of the pair carries a stitcher-disk or member 23 adapted to traverse the surface of the core to stretch and press down the plies or strips of fabric to be formed thereon for producing the desired carcass. The stitchers or stitcher-disks 23 may be of any appropriate design, and are so mounted on the extremities of the arms 22 as to be freely rotatable thereon. The arms are pivoted, as at 24, and have a swinging movement on their pivots so as to move the stitchers in definite and conforming relation to the varying contour of the core 1 as such stitchers traverse the sides of the core in their traveling movement toward the axis thereof, such axial movement being imparted to the disks by the carriage as it moves to and fro in relation to the core.

The arms 22 have extensions 25 which carry upstanding, headed screws 26. These screws are adapted to operate in arcuate slots 27 cut at opposite sides of a fulcrum 28 of an arm or stitcher-controlling member 29. This latter is provided with an extension 30, and to this is pivotally connected an actuating-device, comprising a link 31 and an arm $31^a$, the link and arm being pivotally connected at $31^b$. This arm $31^a$ extends at approximately right-angles to the extension 30 and slides longitudinally in a pair of bearings 32 formed in the upper end of a bracket 33 which is rigid on the standard 6.

The longitudinally slidable arm $31^a$ carries at its free end a plunger 34 working in a housing 35 which carries a pendant roller 36. The plunger 34 is encircled by a spring 37 which bears against a head 38 on the plunger and also against a closure-member 39 of the housing. By this means, the arm 31 has a limited but yielding movement in the housing 35.

The roller 36 is adapted to work in either of two irregularly-shaped cam grooves or slots 40 and 41 formed in the upper surface of a controlling-member or swinging plate 42. This plate has a swinging movement on a pivot 43 disposed on a bracket 44 which is secured rigidly to the side of the standard 6. The controlling member 42 is rigidly held in operative position by spring-pressed locking-pins 45 which are adapted to extend into holes (not shown) formed in the upper part of the bracket 44. The roller 36 is adapted to traverse either the cam-slot 40 or the cam-slot 41, as the case may be, and thereby actuate the housing 35 to cause the slidable arm $31^a$ to swing the arm-controlling member 29 and thereby effect a swinging movement of the stitcher-carriers 22. The two cam grooves or slots 40 and 41 are provided to accomplish relatively different movements of the stitcher-carriers 22 according to whether the stitchers 23 are performing the under-bead or over-bead operation: It will be noted that these cam-slots 40 and 41 are of somewhat different configuration. As shown in Fig. 2, the parts are set to operate for an under-bead operation of the stitchers and to this end the roller 36 occupies an operative position in the cam-slot 40.

If the stitching action has been accomplished for the under-bead operation, and it be then desired to perform the over-bead operation, the operator withdraws the roller 36 on the housing 35 from the slot 40 and positions the roller in the slot 41. To permit this, the plunger 34 is pivotally connected to the arm 31 but the housing, and thus the roller 36, is held in operative position in either of the slots 40 and 41 in the plate 42 by a spring 46. When the shift is made from the slot 40 to the slot 41, or vice versa, the operator withdraws one of the two locking-pins 45 from its hole and this permits the plate 42 to be swung freely on its pivot, this being facilitated by the operator grasping the handle 47 on the plate 42.

Operation: Assuming that a ply of fabric has been initially positioned upon the core 1, and that the stitchers are in the starting position shown in Fig. 2, the operator (through the switch 5) starts the rotation of the core at relatively high speed, and then (again through the switch 5) starts the advancing movement of the carriage. This is accomplished by means of its driving-mechanism, aforementioned, this mechanism functioning to cause the cam-member 8 or carriage-actuator to move the carriage toward the axis of the core. As the carriage and, thus, the stitcher-carriers 22, advance toward the axis of the core, the arm-controlling member 29 will be swung on its fulcrum 28, the swinging movement being controlled by the amount and character of movement permitted to the arm 31$^a$ in its bearings 32, this arm 31$^a$ being, in turn, controlled by the traversing movement of the roller 30 in the slot 40, it being then performing its under-bead operation. By reason of the link-connection between the extension 30 of the controlling member 29 and the arm 31$^a$, the former is permitted to have movement with the carriage and at the same time effect a shifting movement of the arm 31$^a$ in its bearings. Thereupon, the carriage-controlling roller 20, in traversing the cam-groove 19 in the member 8, will cause the carriage to be quickly returned to starting position. The stitchers 23, having formed one or more plies of fabric upon the core, the beads are thereupon positioned at the sides of the fabric-covered core, whereupon the machine will be adjusted to perform the over-bead operation: This will be accomplished by shifting the roller 36 out of the cam-groove 40 and into the cam-groove 41, whereupon, by another advancing movement of the carriage, the roller 36 will then traverse the cam-slot 41, it being noted that this slot is provided with an irregular section 48 which is not similarly provided in the slot 40. This irregular section in the slot 41 causes the proper movement and action of the stitchers in their traveling movement up and around the bead.

Since the plate 42 swings on a fulcrum which is located adjacent one corner, the over-bead controlling-slot 41 is disposed at an angle to the direction in which the slot 40 extends; but, when the plate 42 is swung so as to position it for the traversing movement in it of the roller 36, this slot 41 will occupy a position approximately parallel to the direction of travel of the carriage. The plate 42 is provided with an arcuate slot 49 in which works a headed screw 50 and by which the plate, in its swinging movement, is guided so as properly to position the slots 40 and 41 in respect to the operating position of the roller 36 and the arm 31$^a$.

From the foregoing, it will be perceived that I have devised a simple but effective means of controlling the positioning movement of the stitcher-carriers for the different movements which they must have in presenting the stitchers 23 to the varying contour of the surface of the core and particularly with reference to the beads thereon; the operation of the stitcher-carriers being in timed relation to the travel of the carriage and the movement of the carriage being definitely controlled and predeterminately positionable by the groove-member 8 which forms a part of the carriage-actuating mechanism. By this means, also, the pressure of the stitcher-disks 23 with respect to the sides of the core is accurately equalized, and this is an important desideratum in the action of effecting transverse stretching of the fabric as it is being formed upon the core. As will be seen, the carriage is operated for its advancing and receding movements by a single mechanism which includes the grooved roller 8; this operating in a manner to insure the proper speed of travel of the carriage toward the axis of the core, such advancing movement being relatively slow so that the stitchers 23 may move at slow speed transversely of the ply of fabric and thereby effect a transverse stretching of the same while the stitchers 23 travel along a spiral line which is formed by the progressive movement of the stitchers over the surface of the fabric, the core during this time traveling at relatively high speed.

In addition, the form of the cam-slots 40 and 41 is such as to produce proper movement of the stitcher-controlling member 29 and this in turn imparts the desired relative movement to the stitcher-carriers 22 to effect both a separating movement of the carriers as the stitchers traverse the wider diameter of the core and, then, an inward movement of the carriers as the stitchers traverse the narrowing section of the core.

When the stitchers have reached their limit of inward movement, and the grooved roller 8 has then to accomplish a quick return of the carriage and, thus, of the stitcher-carriers 22 to starting position, the stitcher-controlling member 29 will be rapidly shifted to spread the carriers apart so that the stitchers may not impinge against the core as they are being drawn by the carriage back to their initial position.

What I claim is:

1. A machine for making tire-carcasses comprising a carriage having a to-and-fro movement, and means for effecting such movement including a rotatable driving member directly connected to the carriage and having a cycle of rotation during which the carriage is reciprocated as a complete cycle of movement.

2. A machine for building tire-carcasses including a support, a carriage having a to-and-fro movement thereon, means for effecting such movement including a carriage-actuator having a cycle of movement during which the carriage is advanced and returned as a complete cycle of travel, and means on the carriage and in engagement with the actuator whereby such means and the carriage are given a relatively slow advancing movement and, then, a relatively quick returning movement.

3. A machine for building tire-carcasses including a support, a carriage having a to-and-fro movement thereon, driving mechanism for the carriage including a power-driven cam-member having a cycle of rotation during which the carriage is shifted forward and backward as a complete cycle of movement, and coacting means on the carriage and member for effecting, first, a relatively slow advancing movement of the carriage and, then, a relatively quick returning movement thereof.

4. A machine for building tire-carcasses including a support, a carriage having a to-and-fro movement thereon, a motor-driven shaft journaled in the support, a cam-member on the shaft turning on an axis extending in the general direction of travel of the carriage and means carried by the carriage and coacting with the cam-member for effecting an advancing and receding movement of the carriage.

5. A machine for building tire-carcasses including a standard, a shaft journaled therein, a worm-wheel on the shaft, a worm-gear meshing with the worm-wheel, a shaft on which the worm-gear is mounted and journaled in the standard, a motor for driving the last-mentioned shaft, a cam-member fast on the first-mentioned shaft, a carriage having a to-and-fro movement on the standard, and means depending from the carriage and coacting with the cam-member for effecting an advancing movement of the carriage and then for effecting a returning movement thereof.

6. A machine for building tire-carcasses including a carriage-support, a tire-forming core juxtaposed to the support, a carriage having a to-and-fro movement on the support, and means for actuating the carriage including driving mechanism, a constantly-operating carriage-actuator rotating on an axis extending in the general direction of the travel of the carriage and moving under the influence of the driving mechanism, and means carried by the carriage and coacting with the actuator for effecting an advancing movement of the carriage toward the axis of the core and then a returning movement of the carriage to starting position.

7. A machine for building tire-carcasses including a rotatable tire-forming core, means for effecting movement of the core, a carriage-support, a carriage having a to-and-fro movement on the support, means for actuating the carriage including driving mechanism, a carriage-actuator rotatable on an axis extending in the general direction of the travel of the carriage, having a cycle of rotation during which the carriage is shifted forward and backward as a complete cycle of travel, and moving under the influence of the driving mechanism, and means carried by the carriage and coacting with the actuator for effecting an advancing movement of the carriage toward the axis of the core and then a returning movement of the carriage to starting position.

8. A machine for building tire-carcasses including a rotatable tire-forming core, means for effecting movement of the core, a carriage-support, a carriage having a to-and-fro movement on the support, means for actuating the carriage including driving mechanism, a carriage-actuator moving under the influence of the driving mechanism, and means carried by the carriage and coacting with the actuator for effecting an advancing movement of the carriage toward the axis of the core and then a returning movement of the carriage to starting position, said driving mechanism including a motor operable independently of the core-moving means.

9. A tire-building machine including a support, a carriage having a to-and-fro movement thereon, means for effecting advancing and receding movements of the carriage including a carriage-actuator having a cycle of action during which the carriage is shifted forward and backward as a complete cycle of movement, stitcher-carriers on the carriage having a swinging movement, a carrier-controlling member on the carriage and connected to the stitcher-carriers, a cam-member juxtaposed to the stitcher-carriers, and a connection between the stitcher-controlling member and the cam-member and influenced by the latter to actuate the former and thereby move the stitcher-carriers.

10. A tire-building machine including a support, a carriage having a to-and-fro movement thereon, means for effecting advancing and receding movements of the carriage including a carriage-actuator having a cycle of action during which the carriage is shifted forward and backward as a complete cycle of movement, stitcher-carriers on the carriage having a swinging movement, a carrier-controlling member on the carriage and connected to the stitcher-carriers, a cam-member juxtaposed to the stitcher-carriers, and a connection between the stitcher-controlling member and the cam-member and influenced by the latter to actuate the former and thereby move the stitcher-carriers, the movement of the stitcher-controlling member being in timed relation to the movement of the carriage-actuator.

11. A tire-building machine including a support, a carriage having an automatic to-and-fro movement thereon, a carriage-actuator having a cycle of action during which the carriage is given an advancing and receding movement as a complete cycle of travel, stitcher-carriers mounted for a swinging movement on the carriage, a controlling member for the carriers fulcrumed for a swinging movement on the carriage, a cam-carrying member juxtaposed to the stitcher-controlling member, and a connection between the stitcher-controlling member and the cam-carrying member whereby, as the carriage is moved, actuation of the stitcher-carriers is effected under the guiding influence of the cam-carrying member.

12. A tire-building machine including a support, a carriage having an automatic to-and-fro movement thereon, a carriage-actuator having a cycle of action during which the carriage is given an advancing and receding movement as a complete cycle of travel, stitcher-carriers mounted for a swinging movement on the carriage, a controlling member for the carriers fulcrumed for a swinging movement on the carriage, a cam-carrying member juxtaposed to the stitcher-controlling member, a connection between the stitcher-controlling member and the cam-carrying member whereby, as the carriage is moved, actuation of the stitcher-carriers is effected under the guiding influence of the cam-carrying member, and means for effecting movement of the carriage comprising driving mechanism including a carriage-actuator whereby the movement imparted by it to the carriage is transmitted to the stitcher-controlling member to actuate the stitcher-carriers.

13. A machine for building tire-carcasses including a support, a carriage having a to-and-fro movement thereon, stitcher-carriers pivoted on the carriage, stitcher-disks freely rotatable on the carriers, a stitcher-controlling member pivoted on the carriage and provided with arcuate slots, means carried by the carriers and working in the slots whereby the carriers are swung on their pivots, a cam-member swingingly mounted on the support and provided with a plurality of cams, a cam-traversing device working in one or another of the cams, and a connection between the cam-traversing device and the stitcher-controlling member.

14. A machine for building tire-carcasses including a support, a carriage having a to-and-fro movement thereon, stitcher-carriers pivoted on the carriage, stitcher-disks freely rotatable on the carriers, a stitcher-controlling member pivoted on the carriage and provided with arcuate slots, means carried by the carriers and working in the slots whereby the carriers are swung on their pivots, a cam-member swingingly mounted on the support and provided with a plurality of cams, a cam-traversing device working in one or another of the cams, a connection between the cam-traversing device and the stitcher-controlling member, and a bearing for the connection whereby it is guided for a longitudinal sliding movement as the stitcher-controlling member moves with the carriage.

15. A machine for building tire-carcasses including a support, a carriage having a to-and-fro movement thereon, stitcher-carriers pivoted on the carriage, stitcher-disks freely rotatable on the carriers, a stitcher-controlling member pivoted on the carriage and provided with arcuate slots, means carried by the carriers and working in the slots whereby the carriers are swung on their pivots, a cam-member swingingly mounted on the support and provided with a plurality of cams, a cam-traversing device working in one or another of the cams, a connection between the cam-traversing device and the stitcher-controlling member, a bearing for the connection whereby it is guided for a longitudinal sliding movement as the stitcher-controlling member moves with the carriage, and means for holding the cam-member in any of a plurality of positions.

16. A machine for making tire carcasses including a support, a carriage having a to-and-fro movement thereon, a carriage-actuator having a cycle of revolution during which the carriage is first advanced and then returned to starting position as a complete and continuous cycle of travel, and coacting means on the carriage and actuator for effecting such cycle of travel of the carriage.

17. A machine for making tire carcasses including a support, a carriage having a to-and-fro movement thereon, a carriage-actuator having a cycle of movement during which the carriage is first advanced and then returned to starting position as a complete and continuous cycle of travel, coacting means on the carriage and actuator whereby movement of the former is effected by the movement of the latter, stitcher-sustaining members on the carriage, a cam instrumentality on the support, and a connection between the members and the instrumentality whereby, during the motion of said actuator and the cycle-travel of the carriage, said members are actuated.

18. A machine for making tire carcasses including a support, a carriage having a to-and-fro movement thereon, a carriage-actuator having a cycle of movement during which the carriage is first advanced and then returned to starting position as a complete and continuous cycle of travel, coacting means on the carriage and actuator whereby movement of the former is effected by the latter, stitcher-sustaining members on the carriage, a cam instrumentality on the support, and a conection between the members and the instrumentality whereby, during the motion of said actuator and the cycle-travel of the carriage, said members are actuated, said cam-instrumentality being shiftable at the will of the operator to vary the action of the members.

In witness whereof, I have hereunto signed my name in the presence of two subscribing witnesses.

WILLIAM C. TYLER.

Witnesses:
VIRGINIA C. PEIL,
LIBBIE A. POBORSKY.